US012431579B2

(12) United States Patent
Hu et al.

(10) Patent No.: US 12,431,579 B2
(45) Date of Patent: Sep. 30, 2025

(54) BATTERY, BATTERY PACK, AND AUTOMOBILE

(71) Applicant: BYD COMPANY LIMITED, Guangdong (CN)

(72) Inventors: Shichao Hu, Shenzhen (CN); Mingming Zhang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 483 days.

(21) Appl. No.: 17/988,120

(22) Filed: Nov. 16, 2022

(65) Prior Publication Data

US 2023/0080549 A1 Mar. 16, 2023

Related U.S. Application Data

(63) Continuation of application No. PCT/CN2021/087930, filed on Apr. 16, 2021.

(30) Foreign Application Priority Data

May 18, 2020 (CN) .......................... 202010422008.2

(51) Int. Cl.
| | |
|---|---|
| H01M 50/291 | (2021.01) |
| H01M 50/105 | (2021.01) |
| H01M 50/211 | (2021.01) |
| H01M 50/293 | (2021.01) |
| H01M 50/514 | (2021.01) |
| H01M 50/588 | (2021.01) |
| H01M 50/593 | (2021.01) |

(52) U.S. Cl.
CPC ....... *H01M 50/291* (2021.01); *H01M 50/105* (2021.01); *H01M 50/211* (2021.01);
(Continued)

(58) Field of Classification Search
CPC ............. H01M 50/291; H01M 50/105; H01M 50/211; H01M 50/293; H01M 50/514;
(Continued)

(56) References Cited

U.S. PATENT DOCUMENTS

| | | | |
|---|---|---|---|
| 10,777,791 B1 * | 9/2020 | Wang | B60L 50/64 |
| 2003/0054240 A1 * | 3/2003 | Aronsson | H01M 50/70 |
| | | | 429/81 |

FOREIGN PATENT DOCUMENTS

| | | |
|---|---|---|
| CN | 105789923 A | 7/2016 |
| CN | 206432312 U | 8/2017 |
| | (Continued) | |

OTHER PUBLICATIONS

International Search Report and Written Opinion for Application No. PCT/CN2021/087930, mailed on Jul. 5, 2021, 10 pages.
(Continued)

*Primary Examiner* — Helen Oi K Conley
(74) *Attorney, Agent, or Firm* — Sheppard Mullin Richter & Hampton LLP

(57) ABSTRACT

A battery includes a housing and multiple electrode core assemblies in the housing. The electrode core assemblies are connected. Each electrode core assembly includes an encapsulation film and an electrode core arranged in an accommodating cavity defined by the encapsulation film. An insulating spacer is arranged between two connected electrode core assemblies and has a through hole. The electrode core assembly includes a first electrode and a second electrode. The first electrode of one electrode core assembly is connected to the second electrode of the other electrode core assembly of the connected two electrode core assemblies at a connecting part accommodated in the through hole. The insulating spacer includes a peripheral surface facing an inner surface of the housing. A metal member is arranged on the peripheral surface of the insulating spacer. The metal member is connected to the housing to fix the insulating spacer with the housing.

20 Claims, 9 Drawing Sheets

(52) U.S. Cl.
CPC ....... *H01M 50/293* (2021.01); *H01M 50/514* (2021.01); *H01M 50/588* (2021.01); *H01M 50/593* (2021.01); *H01M 2220/20* (2013.01)

(58) Field of Classification Search
CPC ............. H01M 50/588; H01M 50/593; H01M 2220/20; H01M 50/289; H01M 50/471; H01M 50/224; H01M 50/264; H01M 50/51; H01M 50/209; H01M 50/249; Y02E 60/10; Y02P 70/50
See application file for complete search history.

(56) References Cited

FOREIGN PATENT DOCUMENTS

| | | |
|---|---|---|
| CN | 110233230 A | 9/2019 |
| CN | 110323385 A | 10/2019 |
| CN | 110518156 A | 11/2019 |
| CN | 110518174 A | 11/2019 |
| CN | 110828717 A | 2/2020 |
| CN | 212392355 U | 1/2021 |
| JP | 2004119043 A | 4/2004 |
| JP | 2005038688 A | 2/2005 |
| KR | 10-2019-0046404 A | 5/2019 |
| KR | 10-2019-0135865 A | 12/2019 |

OTHER PUBLICATIONS

Request for the Submission of an Opinion mailed Apr. 16, 2025, issued in related Korean Patent Application No. 10-2022-7043542, with English machine translation (14 pages).

Request for the Submission of an Opinion mailed May 28, 2025, issued in related Korean Patent Application No. 10-2022-7043542, with English machine translation (14 pages).

* cited by examiner

BATTERY, BATTERY PACK, AND AUTOMOBILE

CROSS-REFERENCE TO RELATED APPLICATIONS

The application is a continuation application of International Patent Application No. PCT/CN2021/087930 filed with the China National Intellectual Property Administration (CNIPA) on Apr. 16, 2021, which is based on and claims priority to and benefits of the Chinese Patent Application No. 202010422008.2, filed on May 18, 2020. The entire content of all of the above-referenced applications is incorporated herein by reference.

FIELD

The present disclosure relates to the field of batteries, and more specifically to a battery, a battery pack, and an automobile.

BACKGROUND

In related art, in order to improve the capacity of a battery, multiple electrode cores are connected in series in a metal housing of the battery, and connecting parts of the electrode cores are easy to distort, break or the like in a use of the battery. In addition, under the conditions of vibration and jolt, the multiple electrode cores are easy to move inside the metal housing, and the relative displacement occurs between the electrode cores, causing damages to the electrode cores, for example, a current collector is damaged, a film is wrinkled, and an active material layer on an electrode sheet falls off, the stability of the battery is poor, and safety problems are easy to occur.

SUMMARY

The present disclosure resolves at least one of the technical problems in the related art.

To resolve the foregoing technical problem, a technical solution used in the present disclosure is as follows.

A first aspect of the present disclosure provides a battery, including a housing and multiple electrode core assemblies disposed in the housing. The electrode core assemblies are connected, each of the electrode core assemblies includes an encapsulation film and at least one electrode core, and the at least one electrode core is disposed in an accommodating cavity defined by the encapsulation film. An insulating spacer is disposed between two connected electrode core assemblies, the insulating spacer has a through hole, each of the electrode core assemblies includes a first electrode and a second electrode for leading out a current, a first electrode of a first electrode core assembly of the two electrode core assemblies is connected to a second electrode of a second electrode core assembly of the two electrode core assemblies, and the first electrode of the first electrode core assembly and the second electrode of the second electrode core assembly are connected at a connecting part accommodated in the through hole. The insulating spacer includes a peripheral surface facing an inner surface of the housing, and a metal member is disposed on the peripheral surface of the insulating spacer and is connected to the housing to fix the insulating spacer with the housing.

In an embodiment, a clamping groove is formed on the peripheral surface of the insulating spacer, the metal member includes a matching piece and a connecting piece connected to the matching piece, the matching piece is coupled to the clamping groove, and the connecting piece is exposed out of the peripheral surface of the insulating spacer and coupled to the housing.

In an embodiment, a shape of the clamping groove is matched with a shape of an opening of the metal member, a side wall of the metal member is clamped in the clamping groove as the matching piece, and a bottom wall of the metal member is connected to the housing as the connecting piece.

In an embodiment, the clamping groove and the matching piece are in interference fit to be fixed with each other.

In an embodiment, the metal member is integrally formed with the insulating spacer by insert molding, and the metal member is made of aluminum.

In an embodiment, the metal member and the housing are fixed by welding.

In an embodiment, a length of the battery extends in a first direction, a length of each of the electrode core assemblies extends in the first direction, the electrode core assemblies are arranged in the first direction, the two connected electrode core assemblies are two adjacent electrode core assemblies, and the insulating spacer is disposed between the two adjacent electrode core assemblies.

In an embodiment, the insulating spacer includes a first insert and a second insert, the first insert and the second insert are respectively disposed on two sides of the connecting part to clamp the connecting part, and the through hole includes a gap between the first insert and the second insert.

In an embodiment, the first insert and the second insert are respectively bonded and fixed to a corresponding electrode core assembly.

A second aspect of the present disclosure provides a battery pack, including the above battery.

A third aspect of the present disclosure provides an automobile, including the above battery pack.

In comparison to the related art, the beneficial effects of the present disclosure are as follows.

According to the present disclosure, the insulating spacer is arranged between the two electrode core assemblies connected in series, and the connecting part of the two electrode core assemblies connected in series are arranged in the insulating spacer. Therefore, by using the insulating spacer, each electrode core assembly can be better fixed, the movement of the electrode core assemblies can be prevented, the connection between the electrode core assemblies can be securely maintained, and the strength of the connecting part can be enhanced, such that the connecting part between the electrode core assemblies can be prevented from being distorted, broken or the like during the use of the battery, and the connection reliability between the electrode core assemblies can be improved. Meanwhile, the insulating spacer includes a peripheral surface facing the inner surface of the metal housing, the metal member is arranged on the peripheral surface of the insulating spacer, and the metal member is connected to the metal housing to fix the insulating spacer with the metal housing, such that movement of the electrode core assemblies in the first direction can be prevented, the effective connection between the electrode core assemblies can be maintained, the mechanical strength of the batter can be improved, and the battery can be prevented from being distorted, broken or the like during the use of the battery.

DETAILED DESCRIPTION

Figure 1:
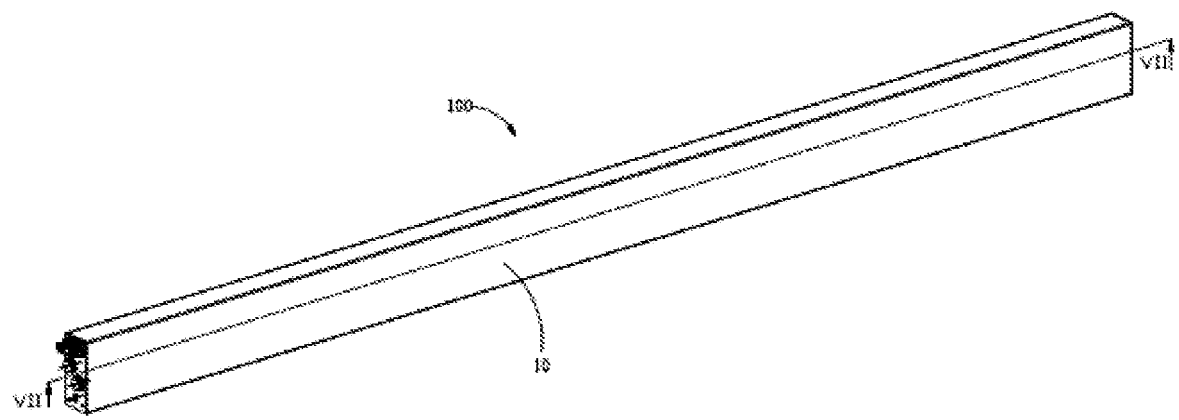
FIG. 1 is a schematic structural diagram of a battery provided by an embodiment of the present disclosure.

Embodiments of the present disclosure are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary, to explain the present disclosure and do not construe a limitation to the present disclosure.

In descriptions of the present disclosure, it should be understood that direction or position relationships indicated by terms such as "length", "width", "above", "below", "front", "back", "left", "right", "vertical", "horizontal", "top", "bottom", "inside", and "outside" are direction or position relationships based on the accompanying drawings, and are used only for conveniently describing this disclosure and simplifying descriptions, instead of indicating or suggesting that a represented apparatus or component needs to have a particular direction or is constructed and operated in a particular direction, and therefore shall not be understood as limiting this disclosure.

In addition, the terms "first" and "second" are used merely for the purpose of description, and shall not be construed as indicating or implying relative importance or implying a quantity of indicated technical features. Therefore, features defining "first" and "second" may explicitly or implicitly include one or more such features. In the descriptions of the present disclosure, "a plurality of" means two or more than two, unless otherwise definitely and specifically limited.

In the present disclosure, unless expressly stated and defined otherwise, the terms "mounting", "connected", "connection", "fixed", etc. are to be construed broadly, for example, as fixed connection, detachable connection or integral connection, as mechanical connection or electrical connection, and as direct connection or indirect connection via an intermediary or communication inside two elements or interaction between two elements. A person of ordinary skill in the related art can understand specific meanings of the foregoing terms in the present disclosure according to a specific situation.

The present disclosure provides a battery, including a metal housing and multiple electrode core assemblies packaged or disposed in the metal housing. The electrode core assemblies are connected in series. The electrode core assembly includes an encapsulation film and at least one electrode core, the at least one electrode core being arranged in an accommodating cavity surrounded or defined by the encapsulation film. An insulating spacer is arranged between the two electrode core assemblies connected in series. A through hole is provided in the insulating spacer. The electrode core assembly has a first electrode and a second electrode for leading out a current. The first electrode of one electrode core assembly is connected to the second electrode of the other electrode core assembly of the two electrode core assemblies connected in series, and a connecting part of the first electrode and the second electrode connected correspondingly is accommodated in the through hole. The insulating spacer includes a peripheral surface facing an inner surface of the metal housing. A metal member is arranged on the peripheral surface of the insulating spacer. The metal member is connected to the metal housing to fix the insulating spacer with the metal housing.

In comparison to the related art, the beneficial effects of the present disclosure are as follows.

According to the present disclosure, the insulating spacer is arranged between the two electrode core assemblies connected in series, and the connecting part of the two electrode core assemblies connected in series is arranged in the insulating spacer. Therefore, by using the insulating spacer, each electrode core assembly can be better fixed, the movement of the electrode core assemblies can be prevented, the connection between the electrode core assemblies can be securely maintained, and the strength of the connecting part can be enhanced, such that the connecting part between the electrode core assemblies can be prevented from being distorted, broken or the like during the use of the battery, and the connection reliability between the electrode core assemblies can be improved. Meanwhile, the insulating spacer includes a peripheral surface facing the inner surface of the metal housing, the metal member is arranged on the peripheral surface of the insulating spacer, and the metal member is connected to the metal housing to fix the insulating spacer with the metal housing, which can further prevent the electrode core assemblies from moving, and improve the stability.

Figure 2:
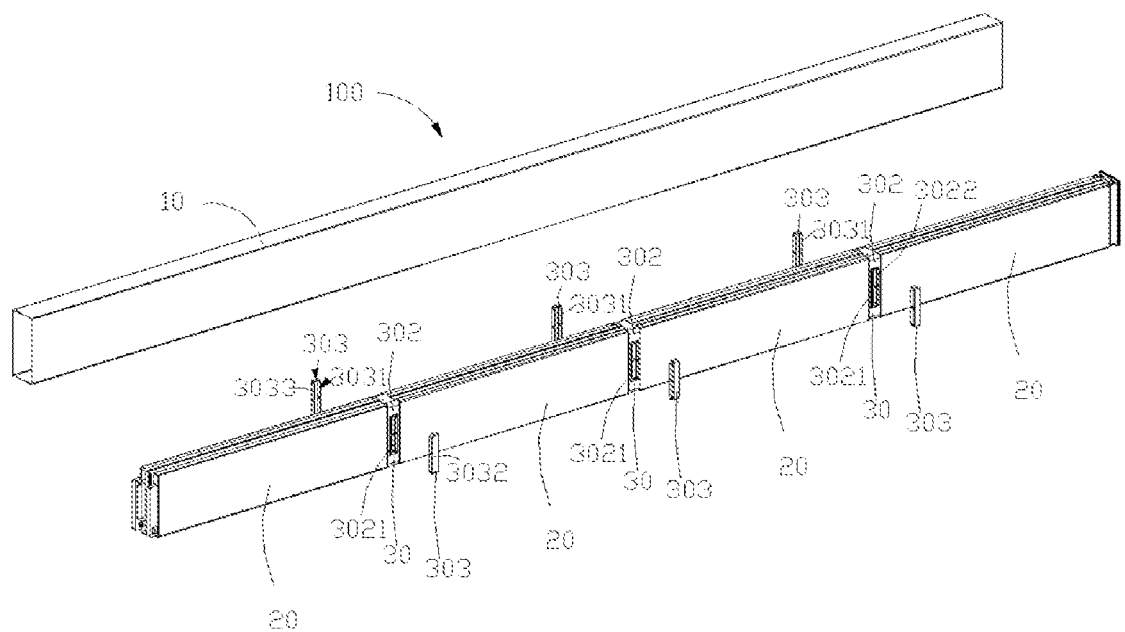
FIG. 2 is a disassembled schematic structural diagram of a part of a battery provided by an embodiment of the present disclosure.
Figure 3:
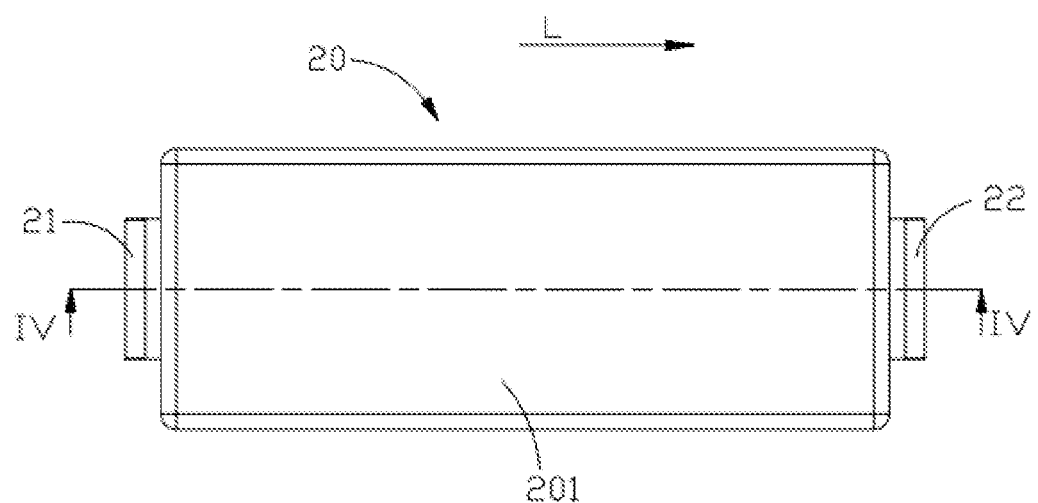
FIG. 3 is a schematic structural diagram of an electrode core assembly in an embodiment of the present disclosure.
Figure 4:
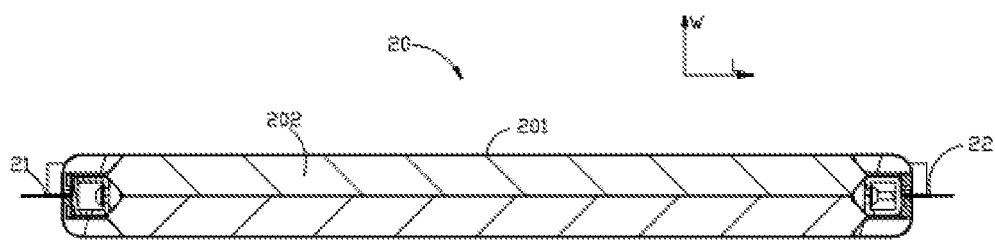
FIG. 4 is a schematic diagram of a cross-section at IV-IV in FIG. 3.
Figure 5:
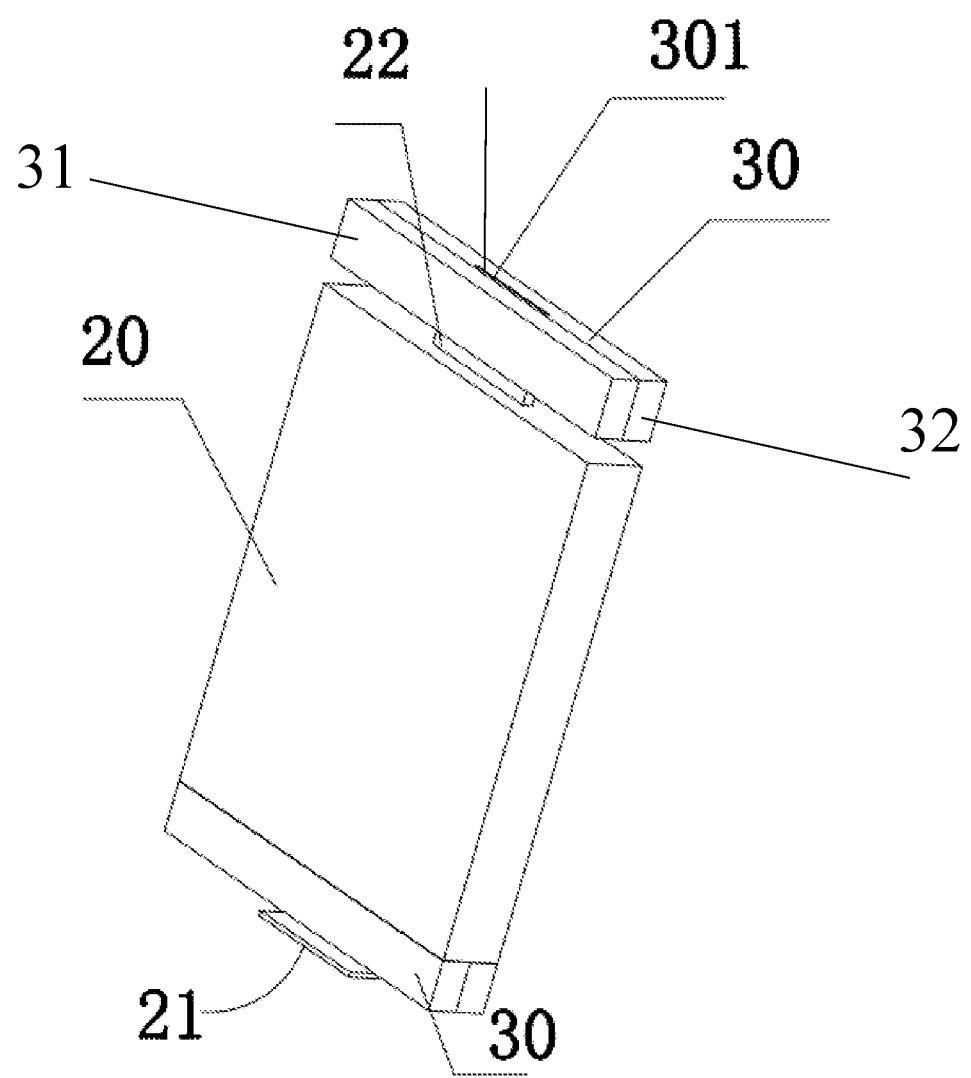
FIG. 5 is a schematic diagram of assembly of an electrode core assembly matched with insulating spacers of the present disclosure.
Figure 6:
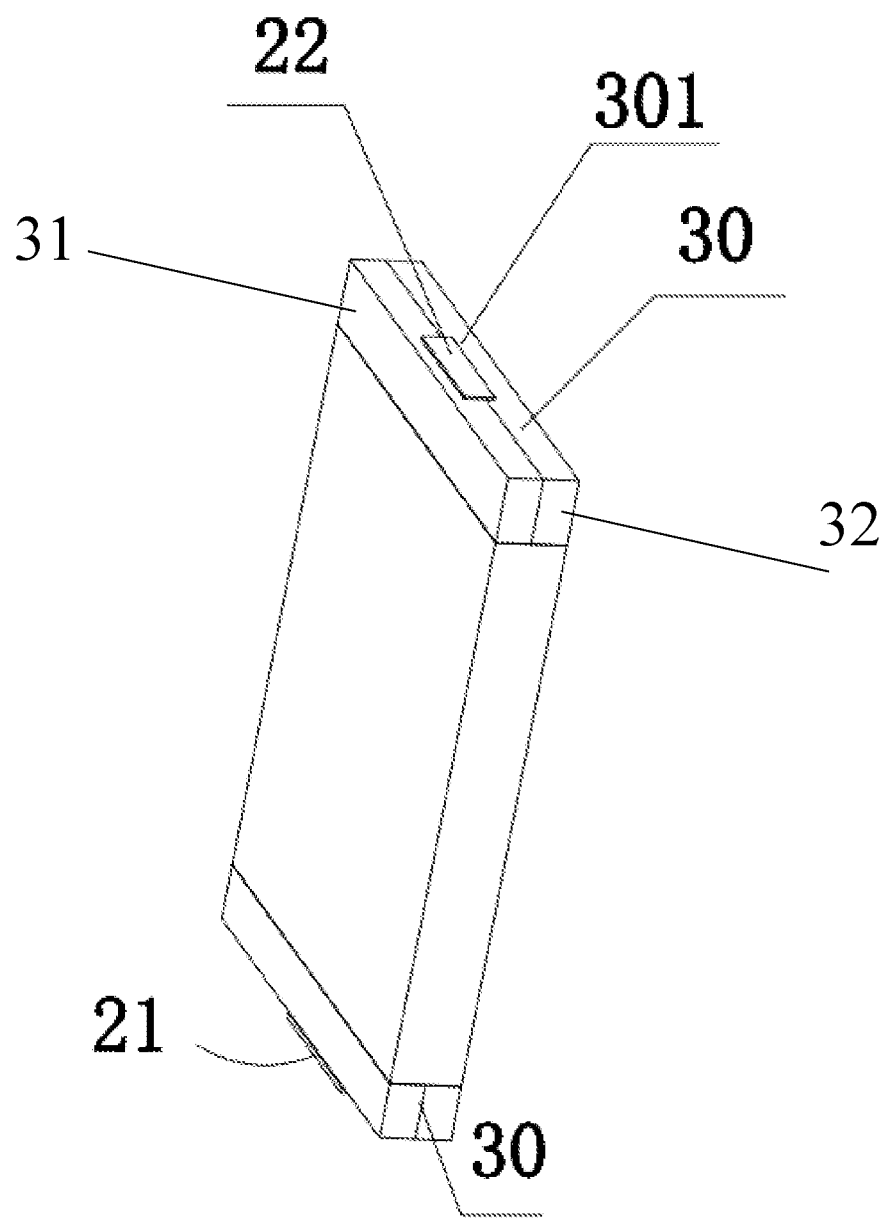
FIG. 6 is a schematic structural diagram of an electrode core assembly matched with insulating spacers of the present disclosure.
Figure 7:
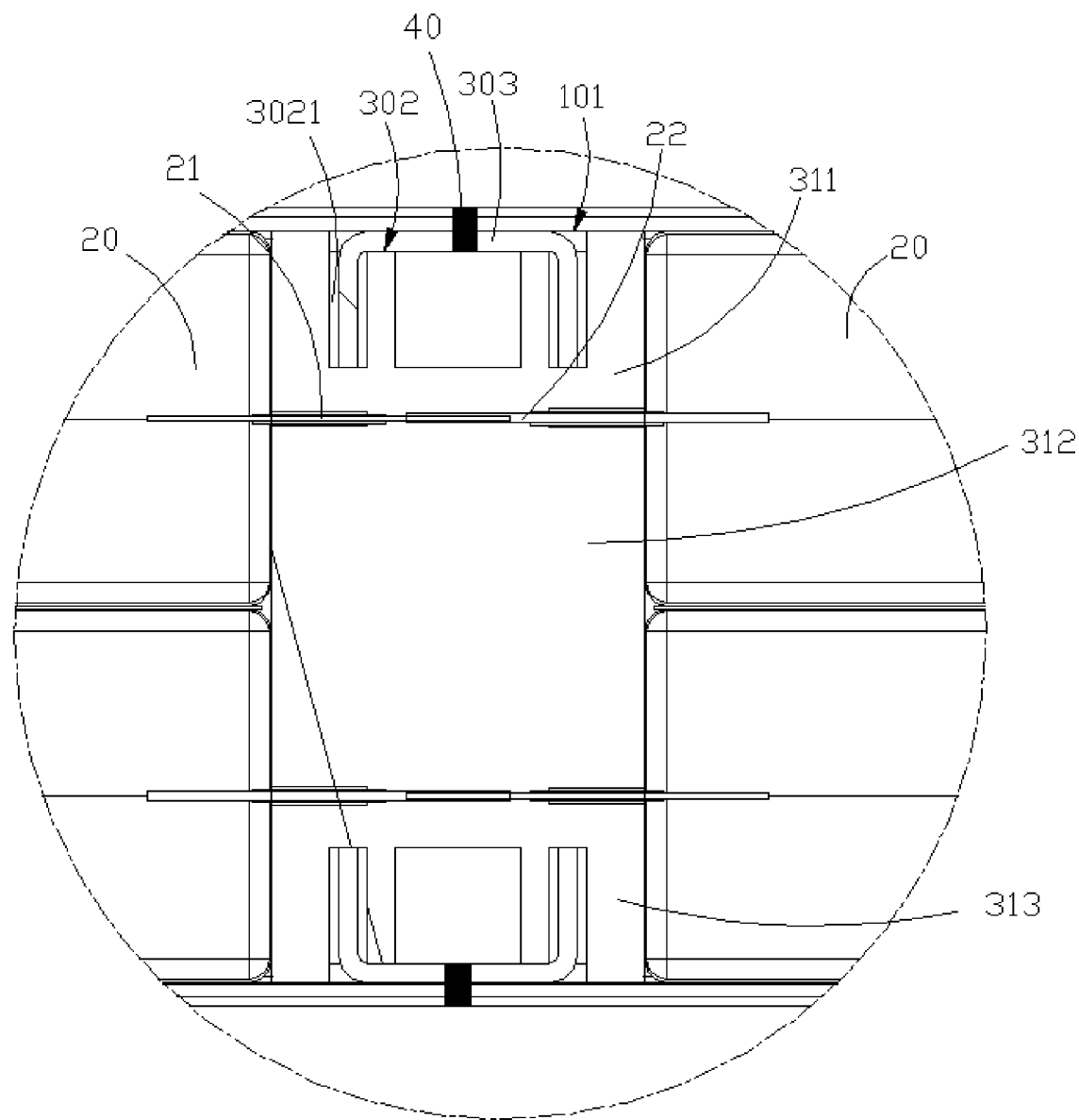
FIG. 7 is a partial enlarged view of a schematic cross section view of the battery in FIG. 1 on line VII-VII according to an embodiment of the present disclosure.

Referring to FIG. 1-FIG. 2, a battery 100 includes a metal housing 10 and multiple electrode core assemblies 20 packaged to the metal housing 10, the electrode core assemblies 20 being connected in series. Referring to FIG. 3 and FIG. 4, the electrode core assembly 20 includes an encapsulation film 201 and at least one electrode core 202. The at least one electrode core 202 is arranged in an accommodating cavity which is surrounded/defined by the encapsulation film 201. In an embodiment, the encapsulation film 201 may be an aluminum-plastic composite film or a high polymer material composite film. Further referring to FIG. 2, the insulating spacer 30 is arranged between the two electrode core assemblies 20 connected in series. Referring to FIG. 5 and FIG. 6, the insulating spacer 30 is provided with a through hole 301. The electrode core assembly 20 has a first electrode 21 and a second electrode 22 for leading out a current. One of the first electrode 21 and the second electrode 22 is a positive electrode, and the other one of the first electrode 21 and the second electrode 22 is a negative electrode. The first electrode 21 of one electrode core assembly 20 is connected to the second electrode 22 of the other electrode core assembly 20 of the two electrode core assemblies 20 connected in series, and a connecting part 306 therebetween is accommodated in the through hole 301. Referring to FIG. 2 and FIG. 7, the insulating spacer 30 includes a peripheral surface 302 facing an inner surface 101 of the metal housing 10. A metal member 303 is arranged on the peripheral surface 302 of the insulating spacer 30. The metal member 303 is connected to the metal housing 10 to fix the insulating spacer 30 with the metal housing 10.

The connecting part 306 between the electrode core assemblies 20 refers to the connecting part where the first electrode 21 of one electrode core assembly 20 of the two electrode core assemblies 20 is connected to the second electrode 22 of the other electrode core assembly 20. The insulating spacer 30 is arranged between the two electrode core assemblies 20 connected in series, and the connecting part 306 of the two electrode core assemblies 20 connected in series is arranged in the insulating spacer 30. Therefore, by using the insulating spacer 30, each electrode core assembly 20 can be better fixed, movement of the electrode core assemblies 20 can be prevented, the connection between the electrode core assemblies 20 can be securely maintained, and the strength of the connecting part can be enhanced, such that the connecting part 306 between the electrode core assemblies 20 can be prevented from distorting, breaking or the like during the use of the battery, and the connection reliability between the electrode core assemblies 20 can be improved. In addition, the insulating spacer 30 includes a peripheral surface 302 facing an inner surface 101 of the metal housing 10, the metal member 303 is arranged on the peripheral surface 302 of the insulating spacer 30, and the metal member 303 is connected to the metal housing 10 to fix the insulating spacer 30 with the metal housing 10, which can further prevent the electrode core assemblies 20 from moving, and improve the stability.

In some embodiments, the length of the battery 100 extends in a first direction L. The thickness of the battery 100 extends in a second direction W. The length of the electrode core assembly 20 extends in the first direction L. The multiple electrode core assemblies 20 may form two electrode core strings, that is, the battery 100 may have two electrode strings therein. The two electrode core strings may be connected in series. For example, the two electrode core strings may be connected in a U shape, that is, the electrodes of the two electrode core strings at the same end (e.g., the first ends) of the two electrode core strings in the first direction L are connected in series, and the electrodes of the two electrode core strings at the other ends (e.g., the second ends) of the two electrode core strings in the first direction L are respectively a positive electrode and a negative electrode of the battery.

Each of the electrode core strings has multiple electrode core assemblies 20. The two electrode core strings are arranged in the second direction W, and the multiple electrode core assemblies 20 in each of the electrode core strings are arranged along the first direction L. In addition, the first electrode 21 and the second electrode 22 of each electrode core assembly 20 are arranged at two opposite ends of the electrode core assembly 20 in the first direction L, and the two electrode core assemblies 20 connected in series are the two adjacent electrode core assemblies 20. That is, in the embodiment of the present disclosure, among the multiple electrode core assemblies 20 in each of the electrode core strings, every two adjacent electrode core assemblies 20 are connected in series. Therefore, the multiple electrode core assemblies 20 in each electrode core string has an end-to-end arrangement mode. Due to such an arrangement mode, the serial connection of every two of the electrode core assemblies 20 can be conveniently realized, and the connection structure is simple. In addition, due to such an arrangement mode, the battery 100 with a long length can be conveniently manufactured, such that the battery 100 can be installed in a battery pack housing without support structures such as beams and longitudinal beams, the battery 100 can be directly installed on the housing of the battery pack by using the metal housing 10 of the battery 100 as a support, and thus the internal space of the battery pack can be saved, the volume utilization rate of the battery pack can be improved, and the weight of the battery pack is reduced.

In other embodiments, the battery 100 may include only one electrode core string, that is, all of the electrode core assemblies 20 in the battery 100 are sequentially arranged in the first direction L, and all of the electrode core assemblies 20 are connected in series to form one electrode core string.

When the multiple electrode core assemblies 20 are connected in series, the connecting parts of the electrode core assemblies 20 are the weak parts of the whole battery and are easy to be distorted or broken during the use of the battery, thereby causing the connection failure. Meanwhile, since the multiple electrode core assemblies 20 are connected in series in the battery, the risk that the battery moves in the first direction L is increased. Therefore, according to the present disclosure, the insulating spacer 30 is arranged between the two electrode core assemblies 20 connected in series, and the connecting part 306 of the two electrode core assemblies 20 are arranged in the through hole 301 of the insulating spacer 30, such that the strength of the connecting part can be increased. The insulating spacer 30 includes a peripheral surface 302 facing the inner surface 101 of the metal housing 10, the metal member 303 is arranged on the peripheral surface 302 of the insulating spacer 30, and the metal member 303 is connected to the metal housing 10 to fix the insulating spacer 30 with the metal housing 10, to prevent the electrode core assemblies 20 from moving in the first direction L, to maintain the effective connection between the electrode core assemblies 20, to increase the mechanical strength of the battery 100, and to prevent the battery 100 from be distorted, broken or the like during the use of the battery.

In an embodiment of the present disclosure, the metal housing 10 may be an aluminum housing, or other metals may also be selected as required. Therefore, the metal housing 10 has enough strength and is prevented from being crashed or deformed, thereby improving the safety of the battery 100.

In some embodiments, the encapsulation film 201 is an aluminum-plastic composite film or a high polymer material composite film. The first electrode 21 and the second electrode 22 of the electrode core assembly 20 extend out of the encapsulation film 201. That is, in the embodiment of the present disclosure, the insulating spacer 30 is arranged outside the encapsulation film 201. The connection reliability between the electrode core assemblies 20 is improved by arranging the insulating spacer 30 outside the film.

The electrode core 202 mentioned in the present disclosure may also be understood as an electrode core commonly used in the field of power batteries. The electrode core and the electrode core assembly 20 are parts inside the metal housing 10 of the battery 100 and shall not be understood as the battery itself. The electrode core 202 may be an electrode core formed by winding. The electrode core 202 generally refers to an assembly that is not fully sealed. Therefore, the battery referred to herein shall not be simply understood as a battery module or battery pack because the battery includes the multiple electrode cores 202. In the present disclosure, the electrode core assembly 20 may include an independent electrode core, or include multiple electrode cores being connected in parallel to form the electrode core assembly 20.

In some embodiments of the present disclosure, when the battery 100 has two electrode core strings, that is, two electrode core assemblies 20 are arranged on each side of the insulating spacer 30 in the first direction L, the number of the electrode core assemblies 20 can be increased, thereby increasing the electric capacity of the battery 100.

In some other embodiments of the present disclosure, only one electrode core assembly 20 is arranged in the second direction W, and the multiple electrode core assemblies 20 extend in the first direction L, that is, only one electrode core assembly 20 is arranged on each side of the insulating spacer 30 in the first direction L. Such a situation can be understood as only one electrode core string is arranged in the battery 100.

In some embodiments of the present disclosure, in order to fix the metal member 303 with the insulating spacer 30, a clamping groove 3021 is provided on the peripheral surface 302 of the insulating spacer 30. The metal member 303 includes a matching piece 3031 and a connecting piece 3032 connected to the matching piece 3031. The matching piece 3031 is clamped or coupled into the clamping groove 3021. The connecting piece 3032 extends out of the peripheral surface 302 of the insulating spacer to be connected to the metal housing 10.

Therefore, the connection stability between the insulating spacer 30 and the metal member 303 is improved through buckling fit of the clamping groove 3021 and the matching piece 3031.

In some embodiments of the present disclosure, the matching piece 3031 includes multiple matching sheets 3033 extending perpendicularly from the periphery of the connecting piece 3032. Gaps are provided between the matching sheets 3033. For example, in the present embodiment, there are 6 matching sheets 3033, and gaps are provided between every two matching sheets 3033. Similarly, the clamping groove 3021 includes buckling grooves 3022 corresponding to the matching sheets 3033. For example, in the present embodiment, the clamping groove 3021 may include 6 buckling grooves 3022, and the six buckling grooves 3022 fit the side wall of the clamping groove 3021. Each matching sheet 3033 is correspondingly inserted into one buckling groove 3022.

Therefore, the matching sheets 3033 allows the matching piece 3031 to be more interchangeable, and are easier to be matched with the corresponding buckling grooves 3022.

In some embodiments of the present disclosure, the metal member 303 is of a groove structure, and the shape of the clamping groove 3021 is matched with the shape of an opening of the groove structure. The side wall of the groove structure may be the matching piece 3031 to be clamped into the clamping groove 3021. The bottom wall of the groove structure may be the connecting piece 3032 to be connected to the metal housing 10.

Therefore, the metal member 303 occupies less space, and the overall structure of the battery 100 is more compact.

In some embodiments of the present disclosure, the clamping groove 3021 and the matching piece 3031 are in interference fit to be fixed with each other.

Therefore, the connection stability between the insulating spacer 30 and the metal member 303 is improved through the buckling fit of the clamping groove 3021 and the matching piece 3031.

In some embodiments of the present disclosure, the metal member 303 is integrally formed with the insulating spacer 30 by insert molding, and the metal member may be made of aluminum.

Therefore, the process of installing the metal member 303 is reduced, and the connection stability between the metal member 303 and the insulating spacer 30 is better.

In some embodiments of the present disclosure, referring to FIG. 7, the metal member 303 is fixed to the metal housing 10 by welding, for example, laser welding. As shown in FIG. 7, a laser weld 40 is formed between the metal member 303 and the metal housing 10.

Therefore, the connection stability between the metal member 303 and the metal housing 10 is better, which can prevent the electrode core assemblies 20 from moving in the first direction L, maintain the effective connection between the electrode core assemblies 20, increase the mechanical strength of the battery 100, and prevent the battery 100 from be distorted, broken or the like.

Referring to FIG. 7, when the battery 100 includes two electrode core strings, that is, when two electrode core assemblies 20 are provided on each side of the insulating spacer 30 in the first direction L, the insulating spacer 30 includes a first insulating piece 311, a second insulating piece 312, and a third insulating piece 313 sequentially arranged in the second direction W. The second insulating piece 312 is arranged between the first insulating piece 311 and the second insulating piece 313. Clamping grooves 3021 are respectively provided on the outer surfaces of the first insulating piece 311 and the third insulating piece 313. A through hole 301 is formed between the first insulating piece 311 and the second insulating piece 312, for the connecting part of one electrode core string to pass through. Another through hole 301 is formed between the second insulating piece 312 and the third insulating piece 313, for the connecting part of the other electrode core string to pass through.

In some embodiments of the present disclosure, the two electrode core assemblies 20 connected in series are two adjacent electrode core assemblies 20, the insulating spacer 30 being arranged between the two electrode core assemblies 20.

Therefore, the insulating spacer 30 is arranged between every two adjacent electrode core assemblies 20. The two adjacent electrode core assemblies 20 may be separated by the insulating spacer 30. The insulating spacer 30 and the metal housing 10 are positioned to prevent the electrode core assembly 20 from moving in the first direction L thereof.

In some embodiments of the present disclosure, referring to FIG. 5 and FIG. 6, the insulating spacer 30 is a split insulating spacer which is pre-molded and then installed between the electrode core assemblies 20. The insulating spacer 30 includes a first insert 31 and a second insert 32. The first insert 31 and the second insert 32 are respectively arranged on two sides of the connecting part 306 connecting the first electrode 21 and the second electrode 22, to jointly clamp the connecting part 306. A gap between the first insert 31 and the second insert 32 forms the through hole 301. That is, the first insert 31 and the second insert 32 are respectively arranged on two sides of the connecting part between the electrode core assemblies 20, and the first insert 31 and the second insert 32 abut against the connecting part 306, to jointly clamp the connecting part 306, and fix the connecting part 306 in the insulating spacer 30. The space occupied by the connecting part in the insulation separator 30 is the through hole 301 in the insulation separator 30.

The first insert 31 and the second insert 32 are pre-molded and then assembled. For example, during assembly, after the electrode core assemblies 20 are connected, the first insert 31 and the second insert 32 are respectively fixed to two sides of the connecting part between the electrode core assemblies 20, to realize assembly of the insulating spacer 30 and the electrode core assemblies 20.

In some embodiments of the present disclosure, the first insert 31 and the second insert 32 are respectively bonded and fixed to the electrode core assemblies 20, that is, adhesive layers can be arranged in gaps between the insulating spacer 30 and the electrode core assemblies 20 to fix the insulating spacer 30 with the electrode core assemblies 20. Therefore, each electrode core assembly 20 is securely fixed in the housing, the electrode core assembly 20 can be better prevented from moving, the connection between the electrode core assemblies 20 is ensured, and the safety of the battery is improved.

In other embodiments of the present disclosure, the first insert 31 and the second insert 32 may be fixed to each other in a snap-fit manner, or the first insert 31 and the second insert 32 may be bonded and fixed to each other, or the first insert 31 and the second insert 32 may be bonded and fixed to the connecting part between the electrode core assemblies 20 in a bonding manner.

Therefore, the first insert 31 and the second insert 32 can be fixed with each other, and the matching effect of the first insert 31 and the second insert 32 is better, which is more beneficial to the assembly of other elements.

In other embodiments of the present disclosure, the battery 100 is generally cuboid. The battery 100 is defined with a length L, a thickness W, and a height H. The length L is greater than the height H, and the height H is greater than the thickness W. The length of the battery 100 can be 400-2500 mm. The ratio of the length to the height of the battery 100 can be 4-21.

It should be noted that the battery 100 is generally cuboid. It could be understood that the battery 100 may be a cuboid or a cube. The battery 100 may be approximately a cuboid or a cube that is partially special shaped or has gaps, bulges, chamfers, arcs and bends.

The present disclosure further provides a battery module, including the multiple batteries 100 provided by the present disclosure.

The present disclosure further provides a battery pack 200, including the multiply batteries 100 provided by the present disclosure or the battery module provided by the present disclosure.

Figure 9:
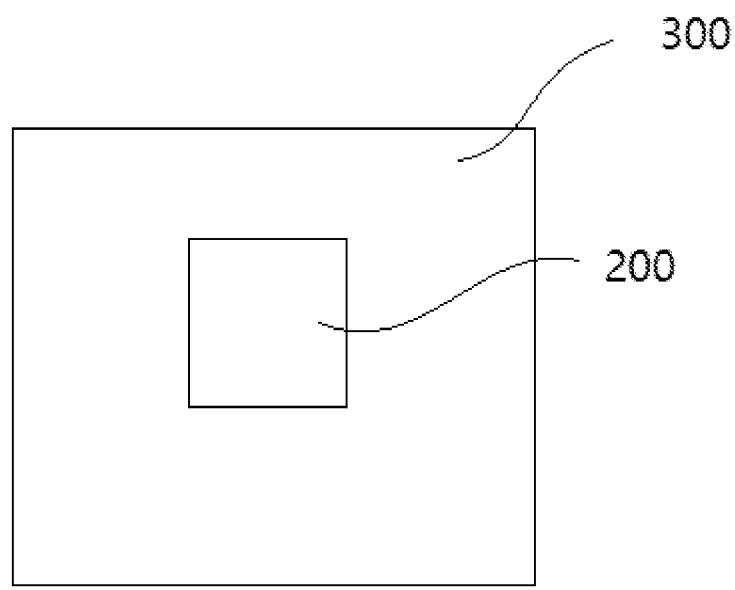
FIG. 9 is a schematic structural diagram of an automobile according to an embodiment of the present disclosure.

As shown in FIG. 9, the present disclosure further provides an automobile 300. The battery pack 200 of the above embodiment is arranged on the automobile 300.

Figure 8:
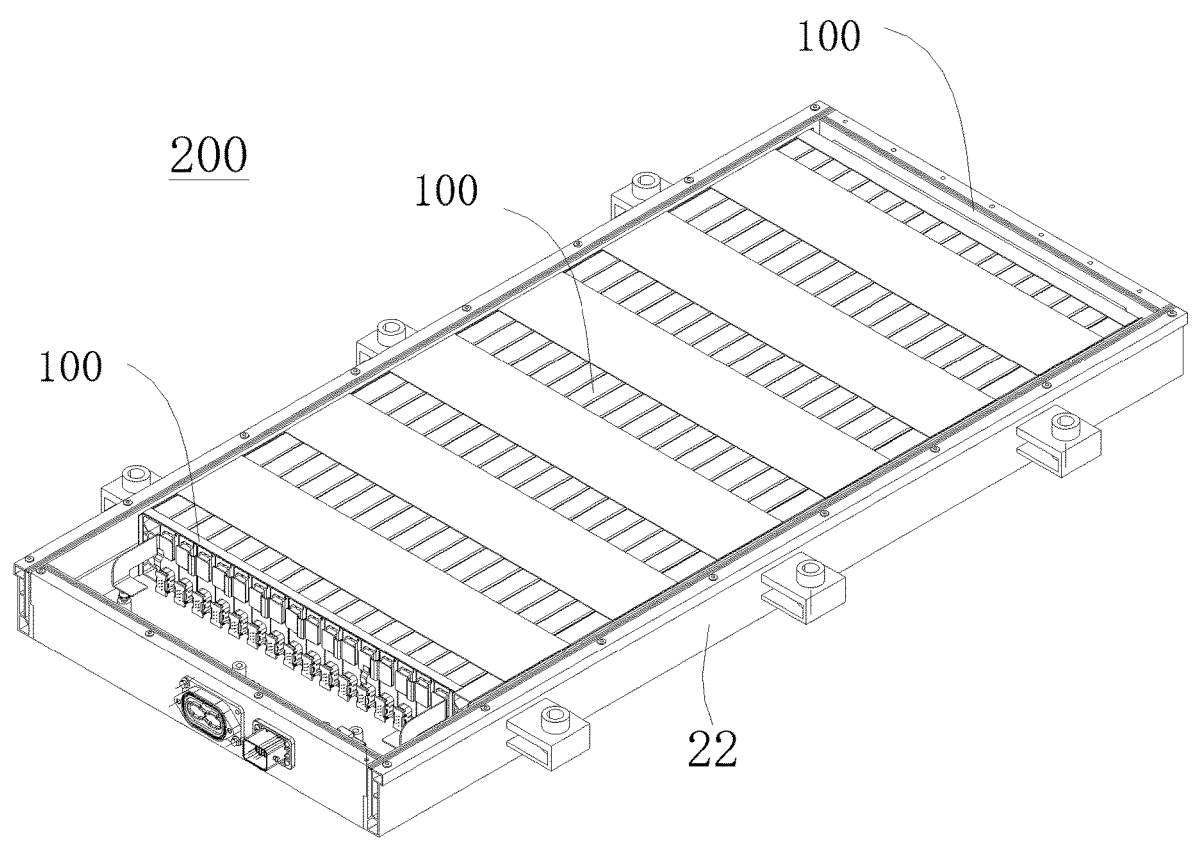
FIG. 8 is a schematic structural diagram of a battery pack according to an embodiment of the present disclosure.

Referring to FIG. 8, the battery pack 200 provided by the present disclosure includes a tray 22 and the batteries 100 arranged on the tray 22.

In conclusion, embodiments of the present disclosure have the above excellent characteristics that are not available in the related art, have the performance better than that in the related art, and is practical, resulting in a product of a great practical value.

The foregoing descriptions are merely some embodiments of the present disclosure, but do not limit this disclosure. Any modification, equivalent replacement, or improvement made within the spirit and principle of the present disclosure shall fall within the protection scope of the present disclosure.

What is claimed is:

1. A battery, comprising a housing and a plurality of electrode core assemblies disposed in the housing, wherein
the electrode core assemblies are connected, each of the electrode core assemblies comprises an encapsulation film and at least one electrode core, and the at least one electrode core is disposed in an accommodating cavity defined by the encapsulation film;
an insulating spacer is disposed between two connected electrode core assemblies, the insulating spacer has a through hole, each of the electrode core assemblies comprises a first electrode and a second electrode for leading out a current, a first electrode of a first electrode core assembly of the two electrode core assemblies is connected to a second electrode of a second electrode core assembly of the two electrode core assemblies, and the first electrode of the first electrode core assembly and the second electrode of the second electrode core assembly are connected at a connecting part accommodated in the through hole; and
the insulating spacer comprises a peripheral surface facing an inner surface of the housing, and a metal member is disposed on the peripheral surface of the insulating spacer and is connected to the housing to fix the insulating spacer with the housing.

2. The battery according to claim 1, wherein a clamping groove is formed on the peripheral surface of the insulating spacer, the metal member comprises a matching piece and a connecting piece connected to the matching piece, the matching piece is coupled to the clamping groove, and the connecting piece is exposed out of the peripheral surface of the insulating spacer and coupled to the housing.

3. The battery according to claim 2, wherein a shape of the clamping groove is matched with a shape of an opening of the metal member, a side wall of the metal member is clamped in the clamping groove as the matching piece, and a bottom wall of the metal member is connected to the housing as the connecting piece.

4. The battery according to claim 2, wherein the clamping groove and the matching piece are in interference fit to be fixed with each other.

5. The battery according to claim 1, wherein the metal member is integrally formed with the insulating spacer by insert molding, and the metal member is made of aluminum.

6. The battery according to claim 1, wherein the metal member and the housing are fixed by welding.

7. The battery according to claim 1, wherein a length of the battery extends in a first direction, a length of each of the electrode core assemblies extends in the first direction, the electrode core assemblies are arranged in the first direction, the two connected electrode core assemblies are two adjacent electrode core assemblies, and the insulating spacer is disposed between the two adjacent electrode core assemblies.

8. The battery according to claim 1, wherein the insulating spacer comprises a first insert and a second insert, the first insert and the second insert are respectively disposed on two sides of the connecting part to clamp the connecting part, and the through hole comprises a gap between the first insert and the second insert.

9. The battery according to claim 8, wherein the first insert and the second insert are respectively bonded and fixed to a corresponding electrode core assembly.

10. A battery pack, comprising a battery comprising a housing and a plurality of electrode core assemblies disposed in the housing, wherein
the electrode core assemblies are connected, each of the electrode core assemblies comprises an encapsulation film and at least one electrode core, and the at least one electrode core is disposed in an accommodating cavity defined by the encapsulation film;
an insulating spacer is disposed between two connected electrode core assemblies, the insulating spacer has a through hole, each of the electrode core assemblies comprises a first electrode and a second electrode for leading out a current, a first electrode of a first electrode core assembly of the two electrode core assemblies is connected to a second electrode of a second electrode core assembly of the two electrode core assemblies, and the first electrode of the first electrode core assembly and the second electrode of the second electrode core assembly are connected at a connecting part accommodated in the through hole; and the insulating spacer comprises a peripheral surface facing an inner surface of the housing, and a metal member is disposed on the peripheral surface of the insulating spacer and is connected to the housing to fix the insulating spacer with the housing.

11. The battery pack according to claim 10, wherein a clamping groove is formed on the peripheral surface of the insulating spacer, the metal member comprises a matching piece and a connecting piece connected to the matching piece, the matching piece is coupled to the clamping groove, and the connecting piece is exposed out of the peripheral surface of the insulating spacer and coupled to the housing.

12. The battery pack according to claim 11, wherein a shape of the clamping groove is matched with a shape of an opening of the metal member, a side wall of the metal member is clamped in the clamping groove as the matching piece, and a bottom wall of the metal member is connected to the housing as the connecting piece.

13. The battery pack according to claim 11, wherein the clamping groove and the matching piece are in interference fit to be fixed with each other.

14. The battery pack according to claim 10, wherein the metal member is integrally formed with the insulating spacer by insert molding, and the metal member is made of aluminum.

15. The battery pack according to claim 10, wherein the metal member and the housing are fixed by welding.

16. The battery pack according to claim 10, wherein a length of the battery extends in a first direction, a length of each of the electrode core assemblies extends in the first direction, the electrode core assemblies are arranged in the first direction, the two connected electrode core assemblies are two adjacent electrode core assemblies, and the insulating spacer is disposed between the two adjacent electrode core assemblies.

17. The battery pack according to claim 10, wherein the insulating spacer comprises a first insert and a second insert, the first insert and the second insert are respectively disposed on two sides of the connecting part to clamp the connecting part, and the through hole comprises a gap between the first insert and the second insert.

18. The battery pack according to claim 17, wherein the first insert and the second insert are respectively bonded and fixed to a corresponding electrode core assembly.

19. An automobile, comprising a battery pack, wherein the battery pack comprises a battery comprising a housing and a plurality of electrode core assemblies disposed in the housing, wherein the electrode core assemblies are connected, each of the electrode core assemblies comprises an encapsulation film and at least one electrode core, and the at least one electrode core is disposed in an accommodating cavity defined by the encapsulation film;

an insulating spacer is disposed between two connected electrode core assemblies, the insulating spacer has a through hole, each of the electrode core assemblies comprises a first electrode and a second electrode for leading out a current, a first electrode of a first electrode core assembly of the two electrode core assemblies is connected to a second electrode of a second electrode core assembly of the two electrode core assemblies, and the first electrode of the first electrode core assembly and the second electrode of the second electrode core assembly are connected at a connecting part accommodated in the through hole; and the insulating spacer comprises a peripheral surface facing an inner surface of the housing, and a metal member is disposed on the peripheral surface of the insulating spacer and is connected to the housing to fix the insulating spacer with the housing.

20. The automobile according to claim 19, wherein a clamping groove is formed on the peripheral surface of the insulating spacer, the metal member comprises a matching piece and a connecting piece connected to the matching piece, the matching piece is coupled to the clamping groove, and the connecting piece is exposed out of the peripheral surface of the insulating spacer and coupled to the housing.

* * * * *